US012682603B2

(12) United States Patent     (10) Patent No.:   US 12,682,603 B2

Uehara et al.     (45) Date of Patent:     Jul. 14, 2026

(54) IMAGE PROCESSING APPARATUS AND METHOD, AND STORAGE MEDIUM FOR GENERATING HIGH-DEFINITION IMAGES

(71) Applicant: CANON KABUSHIKI KAISHA, Tokyo (JP)

(72) Inventors: Yota Uehara, Kanagawa (JP); Shuichi Hosokawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 418 days.

(21) Appl. No.: 18/363,039

(22) Filed: Aug. 1, 2023

(65) Prior Publication Data

US 2023/0377311 A1     Nov. 23, 2023

Related U.S. Application Data

(63) Continuation of application No. PCT/JP2021/048318, filed on Dec. 24, 2021.

(30) Foreign Application Priority Data

Feb. 19, 2021     (JP) ................................ 2021-025524
Dec. 1, 2021     (JP) ................................ 2021-195652

(51) Int. Cl.
    *G06V 10/74*     (2022.01)
    *G06T 3/40*     (2024.01)

(52) U.S. Cl.
    CPC .............. *G06V 10/761* (2022.01); *G06T 3/40* (2013.01)

(58) Field of Classification Search
    CPC ........ G06V 10/761; G06V 10/82; G06T 3/40; G06T 3/4046; G06T 3/4053; H04N 7/01
    See application file for complete search history.

(56) References Cited

U.S. PATENT DOCUMENTS 9,263,090 B2    2/2016   Hosokawa
2006/0165179 A1*   7/2006   Feuer ....................... H04N 7/01
                                  348/E7.003

(Continued)

FOREIGN PATENT DOCUMENTS

CN       111800553 A    10/2020
JP       2003209847 A    7/2003

(Continued)

OTHER PUBLICATIONS

International Search Report issued by the Japan Patent Office on Mar. 22, 2022 in corresponding International Application No. PCT/JP2021/048318, with English translation.

(Continued)

*Primary Examiner* — Ming Y Hon
*Assistant Examiner* — Dominique James
(74) *Attorney, Agent, or Firm* — Carter, DeLuca & Farrell LLP

(57) ABSTRACT

There is provided an image processing apparatus that renders images of a second image group high-definition using a first image group, the second image group including less high frequency components than the first image group does. The image processing apparatus selects, from among supervisory data pieces that each include an image included in the first image group as one of an image pair, a supervisory data piece to be used in learning based on a high definition target image selected from the second image group, learns a learning model using the selected supervisory data piece, infers high frequency components of the high definition target image using the learning model, and generates a high-definition image based on the high definition target image and the inferred high frequency components.

21 Claims, 15 Drawing Sheets

(56) References Cited

U.S. PATENT DOCUMENTS

| | | | | |
|---|---|---|---|---|
| 2011/0026773 | A1* | 2/2011 | Sumitomo | G06T 1/00 |
| | | | | 382/106 |
| 2013/0034271 | A1 | 2/2013 | Sakaguchi | |
| 2017/0193680 | A1* | 7/2017 | Zhang | G06V 10/82 |
| 2018/0129917 | A1* | 5/2018 | Chu | G06N 3/08 |
| 2018/0336662 | A1* | 11/2018 | Kimura | G06T 5/70 |
| 2019/0205650 | A1* | 7/2019 | Iwao | G06V 20/41 |
| 2020/0041612 | A1* | 2/2020 | Harrison | G01S 7/40 |
| 2020/0137326 | A1* | 4/2020 | Jahagirdar | G06T 3/40 |
| 2020/0226718 | A1* | 7/2020 | Reddy | G06T 3/4046 |
| 2020/0387717 | A1* | 12/2020 | Miyamoto | G06V 10/764 |
| 2021/0190664 | A1* | 6/2021 | Duke | G06T 3/4007 |
| 2021/0279511 | A1* | 9/2021 | Gordon | G06N 3/08 |
| 2021/0281813 | A1* | 9/2021 | Vyas | G06T 5/50 |
| 2022/0250624 | A1* | 8/2022 | Park | H04N 13/239 |
| 2022/0253981 | A1* | 8/2022 | Zhang | G06T 5/50 |
| 2023/0110665 | A1 | 4/2023 | Tsukagoshi | |

FOREIGN PATENT DOCUMENTS

| | | | |
|---|---|---|---|
| JP | 2005-522108 | A | 7/2005 |
| JP | 2005-253000 | A | 9/2005 |
| JP | 2012-165232 | A | 8/2012 |
| JP | 2018-206371 | A | 12/2018 |
| JP | 2019-129328 | A | 8/2019 |
| JP | 2019-204167 | A | 11/2019 |
| JP | 2020027982 | A | 2/2020 |
| WO | 03/084207 | A2 | 10/2003 |

OTHER PUBLICATIONS

Kim, J. et al., "Accurate Image Super-Resolution Using Very Deep Convolutional Networks" 2016 IEEE Conference on Computer Vision and Pattern Recognition (Dec. 2016) pp. 1646-1654.

Chinese Office Action issued by the China National Intellectual Property Administration on Apr. 2, 2026 in corresponding CN Patent Application No. 202180094208.2, with English translation.

* cited by examiner

F I G. 1
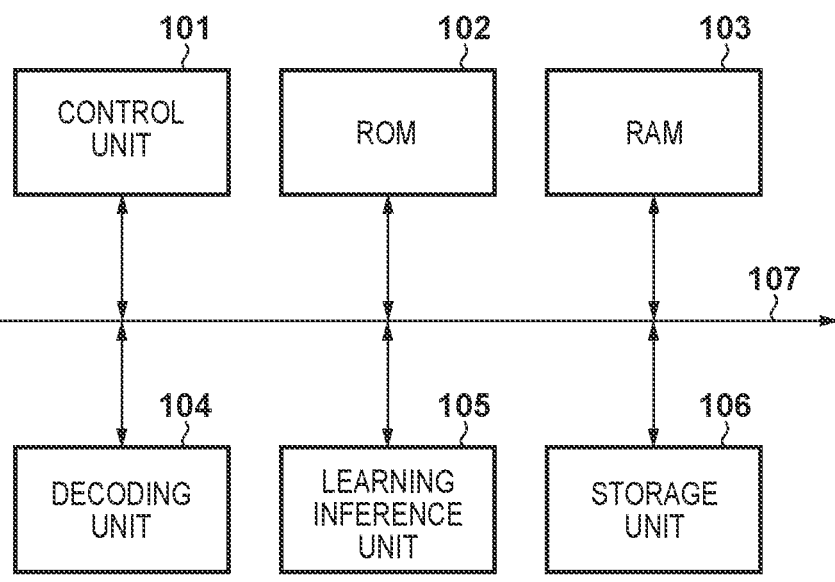

F I G.   5
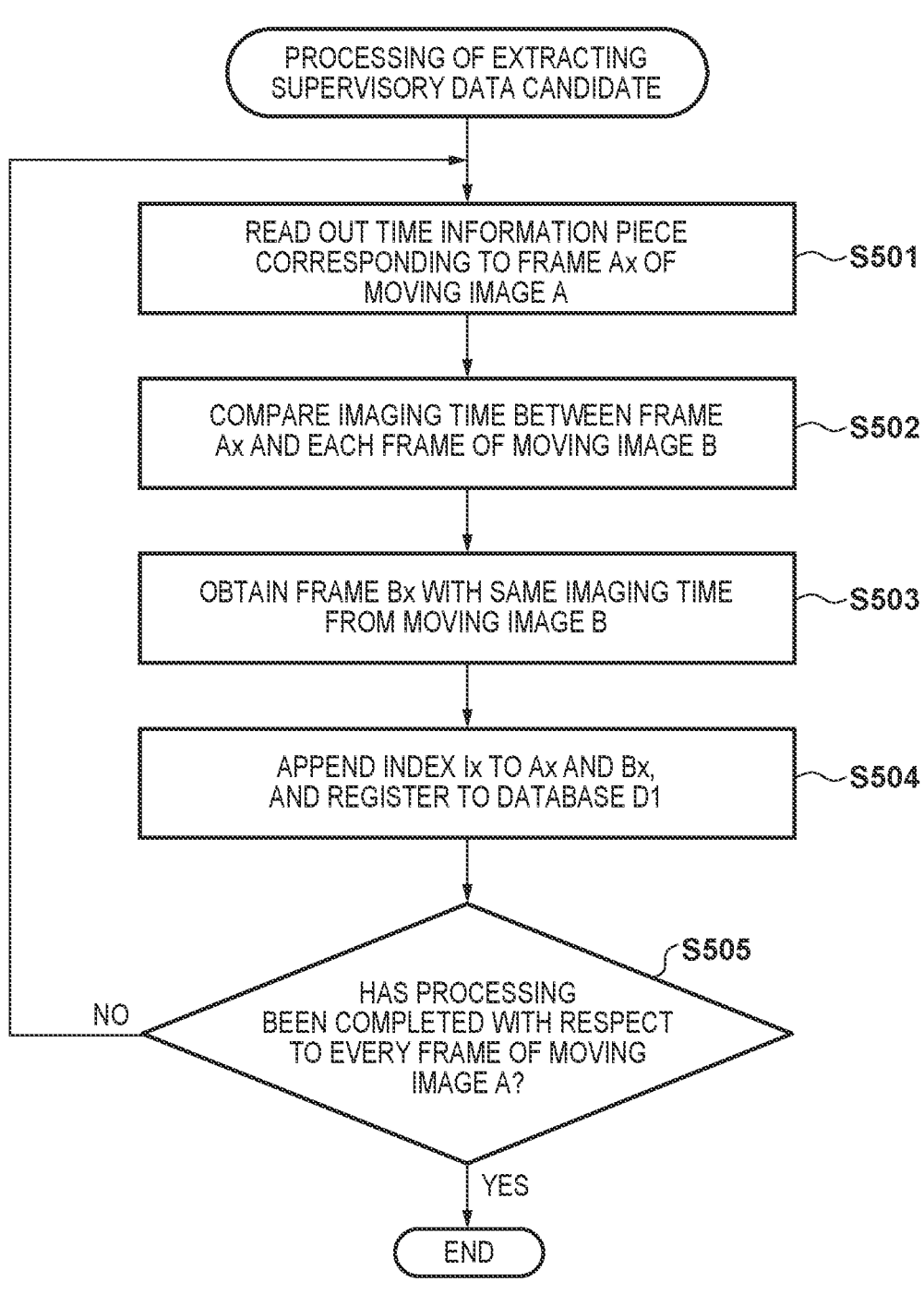

FIG. 6

DATABASE STRUCTURE

| INDEX | FRAME NUMBER OF MOVING IMAGE A | FRAME NUMBER OF MOVING IMAGE B |
|:---:|:---:|:---:|
| 1 | 1 | 2 |
| 2 | 2 | 5 |
| 3 | 3 | 8 |
| ⋮ | ⋮ | ⋮ |
| i-1 | n-1 | m-4 |
| i | n | m-1 |

F I G. 10
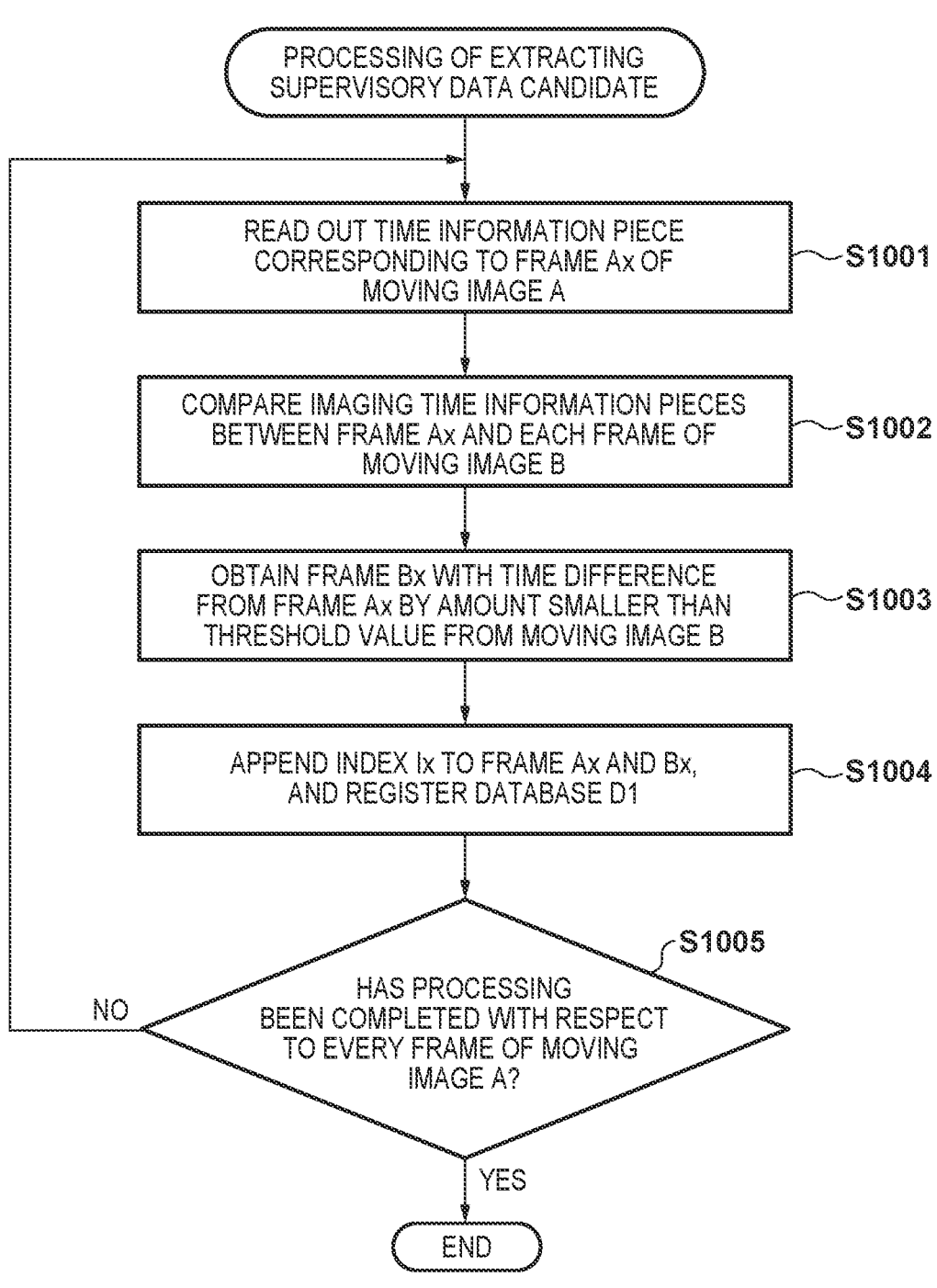

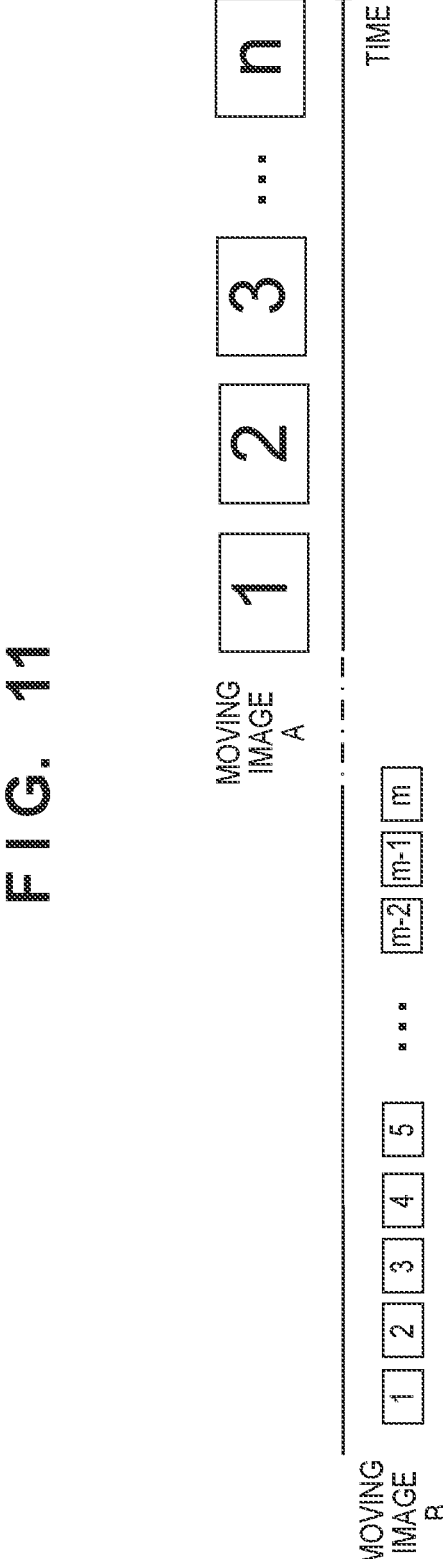
F I G. 11

F I G. 12
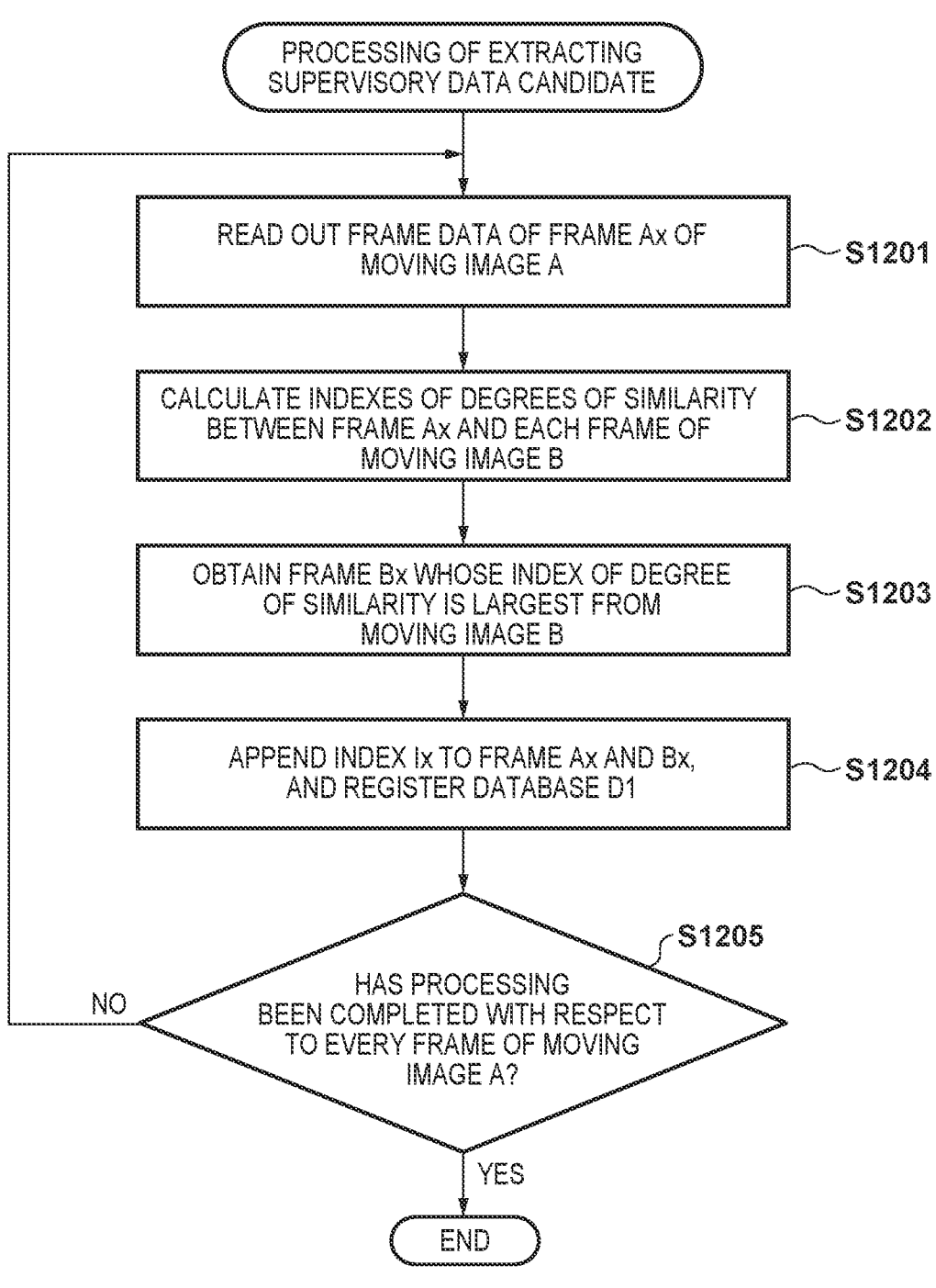

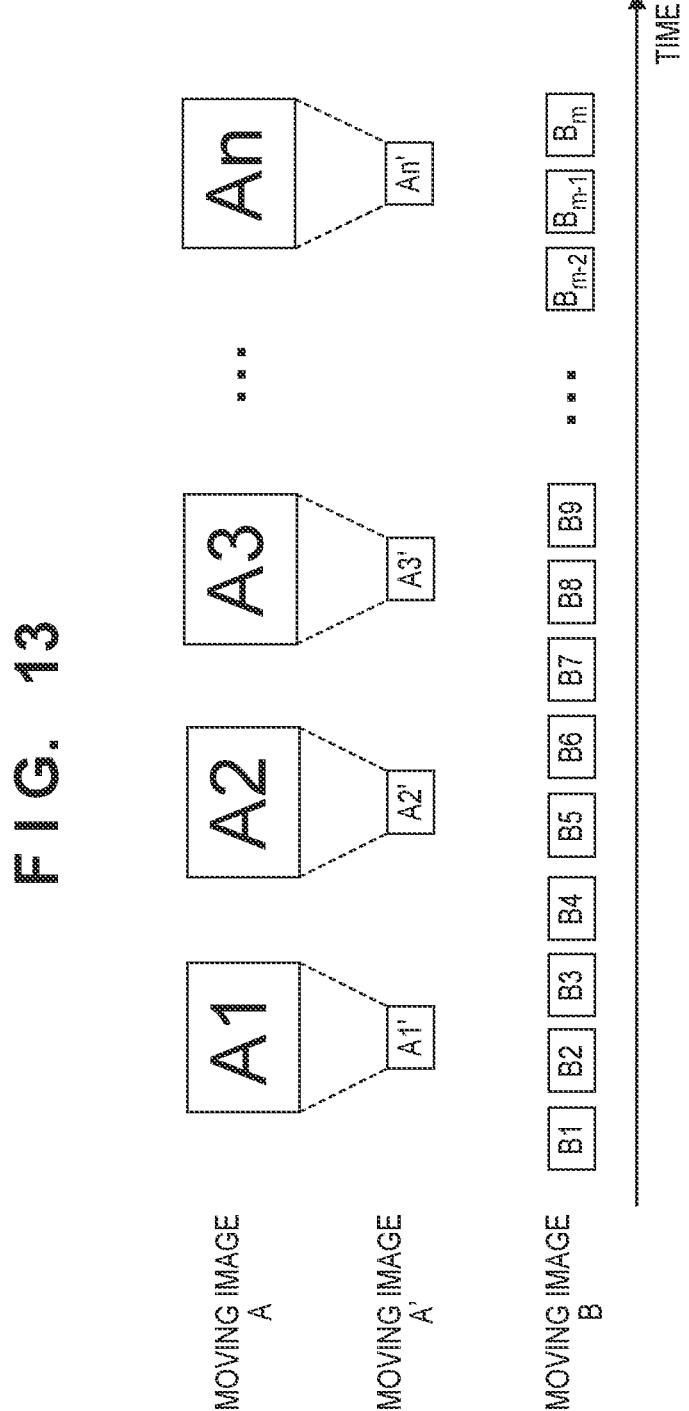
F I G. 13

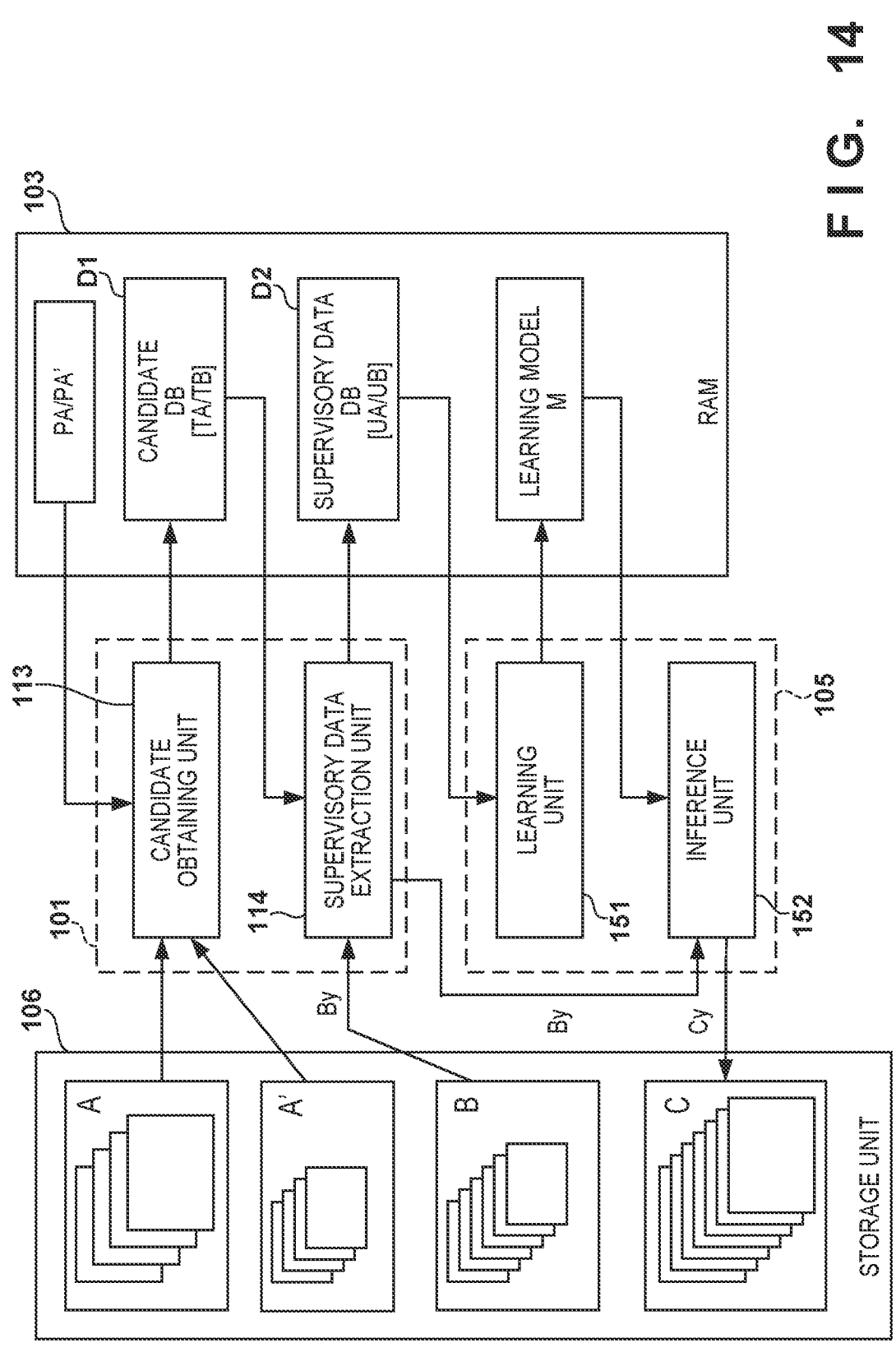
F I G. 14

F I G.   15

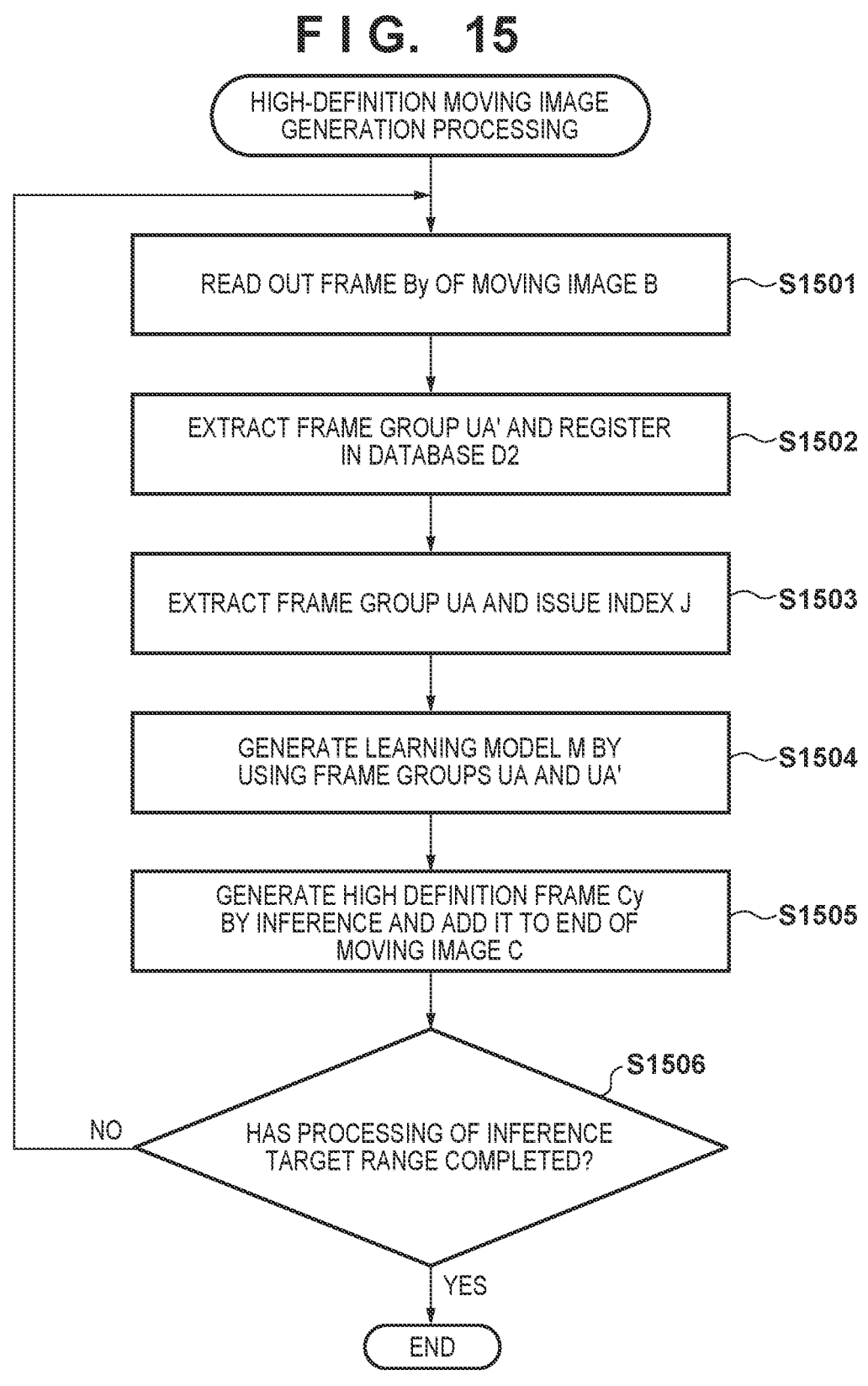

```
    ┌─────────────────────────────────┐
    │  HIGH-DEFINITION MOVING IMAGE   │
    │      GENERATION PROCESSING      │
    └─────────────────────────────────┘
                    │
                    ▼
    ┌─────────────────────────────────┐
    │  READ OUT FRAME By OF MOVING    │──── S1501
    │          IMAGE B                │
    └─────────────────────────────────┘
                    │
                    ▼
    ┌─────────────────────────────────┐
    │  EXTRACT FRAME GROUP UA' AND    │──── S1502
    │  REGISTER IN DATABASE D2        │
    └─────────────────────────────────┘
                    │
                    ▼
    ┌─────────────────────────────────┐
    │  EXTRACT FRAME GROUP UA AND     │──── S1503
    │       ISSUE INDEX J             │
    └─────────────────────────────────┘
                    │
                    ▼
    ┌─────────────────────────────────┐
    │  GENERATE LEARNING MODEL M BY   │──── S1504
    │  USING FRAME GROUPS UA AND UA'  │
    └─────────────────────────────────┘
                    │
                    ▼
    ┌─────────────────────────────────┐
    │  GENERATE HIGH DEFINITION       │──── S1505
    │  FRAME Cy BY INFERENCE AND      │
    │  ADD IT TO END OF MOVING        │
    │        IMAGE C                  │
    └─────────────────────────────────┘
                    │
                    ▼
              ◇ S1506
    NO   ╱  HAS PROCESSING OF  ╲
    ◀────╲  INFERENCE TARGET   ╱
          ╲ RANGE COMPLETED?  ╱
                  │ YES
                  ▼
              ( END )
```

READ OUT FRAME By OF MOVING IMAGE B — S1501

EXTRACT FRAME GROUP UA' AND REGISTER IN DATABASE D2 — S1502

EXTRACT FRAME GROUP UA AND ISSUE INDEX J — S1503

GENERATE LEARNING MODEL M BY USING FRAME GROUPS UA AND UA' — S1504

GENERATE HIGH DEFINITION FRAME Cy BY INFERENCE AND ADD IT TO END OF MOVING IMAGE C — S1505

HAS PROCESSING OF INFERENCE TARGET RANGE COMPLETED? — S1506

IMAGE PROCESSING APPARATUS AND METHOD, AND STORAGE MEDIUM FOR GENERATING HIGH-DEFINITION IMAGES

CROSS-REFERENCE TO RELATED APPLICATIONS

This application is a Continuation of International Patent Application No. PCT/JP2021/048318, filed Dec. 24, 2021, which claims the benefit of Japanese Patent Application No. 2021-025524, filed Feb. 19, 2021 and Japanese Patent Application No. 2021-195652, filed Dec. 1, 2021, all of which are hereby incorporated by reference herein in their entirety.

BACKGROUND OF THE INVENTION

Field of the Invention

The present invention relates to an image processing apparatus and method and a storage medium, and to a technique for rendering an image group high-definition with use of machine learning.

Background Art

Resolution enhanced technologies that use machine learning refer to technologies to, when performing resolution conversion along with image enlargement, generate a high-definition image by inferring, through machine learning, high frequency components that cannot be interpolated using linear interpolation processing for pixel values. With resolution enhanced technologies, first, a learning model is generated using an image group G, as well as deteriorated images obtained by deteriorating the respective images in the image group G using an arbitrary method, as supervisory data. The learning model is generated by learning the differences between the pixel values of original images and deteriorated images, and updating parameters of resolution enhanced processing that are held therein. As a result of inputting an image H that is deficient in high frequency components to the learning model generated in the foregoing matter, the high frequency components are obtained through inference that uses the learning model. A high-definition image can be generated by overlaying the high frequency components obtained through inference on the image H. In a case where the resolution enhanced processing is applied to a moving image, a high-definition moving image can be generated by inputting all frames to the learning model, one frame at a time.

In general, in a case where a product or a service that utilizes a learning model is provided, processing for collecting supervisory data and generating the learning model is executed by a developer, and the generated learning model is provided to a user. Therefore, at the time of the execution of learning processing, the contents of a moving image to be input by the user is unknown. In view of this, in order to enable inference to be performed with respect to a wide variety of inference target moving images with uniform accuracy, the developer side prepares a large number of images of various types with balanced image patterns as supervisory data, and causes them to be learned repeatedly. For example, PTL1 describes a technique to execute resolution enhanced processing with respect to a moving image using a learning model that has learned various types of images. However, as there are various types of supervisory data, very few pieces of supervisory data have a high degree of similarly to inference a target moving image Q designated by a user. In a case where such a learning model has been used, the result of learning images that have a low degree of similarity to inference the target moving image Q is reflected in inference processing. As a result, the resolution is improved, for example, only in the sense that an edge of a subject is enhanced, and it is difficult to accurately infer high frequency components, such as fine patterns of the subject; it cannot be said that the inference accuracy is high. PTL2 describes, as an example of a system for solving the foregoing problem, a method in which a user side performs learning by using, as supervisory data, only images that are similar to the inference target moving image in terms of an imaging location, an imaging condition, and the like, thereby obtaining a high-definition moving image compared to a case where various types of images have been learned.

CITATION LIST

Patent Literature

PTL1: Japanese Patent Laid-Open No. 2019-204167
PTL2: Japanese Patent Laid-Open No. 2019-129328

According to PTL2, learning is performed using pieces of supervisory data that have the same imaging location and have different imaging times. More specifically, videos that have been shot in the past in a partial section S of a route of routed buses are accumulated and learned, and inference is executed with respect to a real-time video of the section S using a learning model that has been obtained as a result thereof. In this case, as only the result of shooting in the section S is used as supervisory data, it represents an image group that has a relatively high degree of similarity to the inference target, and thus an improvement in the inference accuracy can be expected. However, among the images that have been shot in the section S, for example, an image at the start of the section S and an image at the end of the section S are different in the imaging location; they show completely different subjects, and it cannot be said that they have a high degree of similarity to each other. This is a factor for a reduction in the inference accuracy with respect to the entirety of the section S. In addition, the past videos used as supervisory data and the real-time video used as the inference target may be the videos of the same location but show different subjects. With regard to subjects that have not been learned, accurate inference is not performed; this is also a factor for a reduction in the inference accuracy.

In addition, it is described in PTL2 that past videos are categorized into a plurality of groups based on an imaging condition, such as weather, a plurality of learning models are generated by independently performing learning with use of data of each group, and a learning model to be used is switched in accordance with an imaging condition of a real-time video. This technique can suppress a reduction in the inference accuracy attributed to different imaging conditions. However, even if the condition, such as weather, is the same, even the slightest difference in the value of illuminance or the like causes supervisory data and the inference target to have different frequency components, and it cannot be said that a reduction in the inference accuracy can be sufficiently suppressed. Because of these factors, it cannot be said that the accuracy of inference of high-frequency components is sufficient even with the technique of PTL2.

An aspect of the present invention provides a technique to render images high-definition with high accuracy.

SUMMARY OF THE INVENTION

An image processing apparatus according to one aspect of the present invention includes the following constituents. That is to say, an image processing apparatus renders images of a second image group high-definition using a first image group, the second image group including less high frequency components than the first image group does, and includes: a selecting unit configure to select, from among supervisory data pieces that each include an image included in the first image group as one of an image pair, a supervisory data piece to be used in learning based on a high definition target image selected from the second image group; an inferring unit configured to learn a learning model using the supervisory data piece selected by the selecting unit, and infer high frequency components of the high definition target image using the learning model; and a generating unit configured to generate a high-definition image based on the high definition target image and the high frequency components inferred by the inferring unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a block diagram showing a configuration of an image processing apparatus according to a first embodiment.

FIG. 5 is a flowchart of supervisory data candidate obtainment processing according to the first embodiment.

FIG. 6 is a diagram showing an exemplary data structure of a candidate database according to the first embodiment.

FIG. 10 is a flowchart of supervisory data candidate obtainment processing according to the second embodiment.

FIG. 11 is a diagram showing an example of a frame structure of input moving images according to a third embodiment.

FIG. 12 is a flowchart of supervisory data candidate obtainment processing according to the third embodiment.

FIG. 13 is a diagram showing an example of a frame structure of input moving images according to a fifth embodiment.

FIG. 14 is a diagram for describing a functional configuration of the image processing apparatus according to the fifth embodiment.

FIG. 15 is a flowchart of high-definition moving image generation processing according to the fifth embodiment.

DESCRIPTION OF THE EMBODIMENTS

Figure 2:
FIG. 2 is a diagram for describing a functional configuration of the image processing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (Description of Overview of Image Processing Apparatus)

Two moving images, a moving image A and a moving image B that have been shot simultaneously by the same image capturing apparatus, are input to an image processing apparatus of a first embodiment. The relationship between the resolution XA/frame rate FA of the moving image A and the resolution XB/frame rate FB of the moving image B is "XA>XB and FA<FB". The image processing apparatus has a function of generating a learning model using frames of the moving image A and the moving image B, and generating a moving image C with the resolution XA/frame rate FB from the moving image B through inference that uses the generated learning model (a high-definition moving image generation function).

(Description of Configuration of Image Processing Apparatus)

FIG. 1 is a block diagram showing an exemplary hardware configuration of the image processing apparatus according to the first embodiment. A control unit 101 is a computation apparatus, such as a CPU, and realizes various types of functions by deploying a program stored in a ROM 102 into a working area of a RAM 103 and executing the program. The control unit 101 can function as each of such functional blocks as an analysis unit 111 and a decoded moving image generation unit 112 that will be described later using FIG. 2, and a candidate obtaining unit 113 and a supervisory data extraction unit 114 that will be described later using FIG. 3. The ROM 102 stores a control program executed by the control unit 101. The RAM 103 is used for the purpose of a working memory intended for the control unit 101 to execute a program, a temporary storage area for various types of data, and so forth.

A decoding unit 104 decodes moving images or image data that has been compressed in accordance with an encoding format defined by the Moving Picture Experts Group (hereinafter abbreviated as MPEG) into uncompressed data. A learning inference unit 105 includes a functional block that generates/updates a learning model using input supervisory data (a learning unit 151 that will be described later using FIG. 3). Furthermore, the learning inference unit 105 includes a functional block that analyzes an input image using the learning model that has been generated through learning and infers high frequency components, thereby generating a high-definition image corresponding to this input image (an inference unit 152 that will be described later using FIG. 3). In the present embodiment, a convolutional neural network (hereinafter abbreviated as CNN) model for resolution enhanced processing based on a CNN is used as the learning model. This encompasses enlargement of the input image through linear interpolation, generation of high frequency components to be added to the enlarged image, and additive composition thereof.

A storage unit 106 is composed of a storage medium that is attachably and removably connected to an image processing apparatus 100, such as a hard disk drive (HDD) and a memory card, and a storage medium control apparatus that controls the storage medium. In accordance with a command from the control unit 101, the storage medium control apparatus controls initialization of the storage medium, data transfer performed between the storage medium and the RAM 103 for the purpose of reading and writing of data, and so forth. A bus 107 is an information communication path that connects among the discrete functions. The control unit 101, ROM 102, RAM 103, decoding unit 104, learning inference unit 105, and storage unit 106 are connected in such a manner that they can communicate with one another.

Note that the hardware blocks described in the present embodiment and the functional blocks executed therein need not necessarily be configured in the above-described manner. For example, two or more blocks among the control unit 101, decoding unit 104, and learning inference unit 105 may be realized by one item of hardware. Also, the functions of one functional block or the functions of a plurality of functional blocks may be executed via collaborated operations of several items of hardware. Furthermore, each functional block may be realized by the CPU executing a computer program deployed to a memory, or may be realized by dedicated hardware. Moreover, it is also permissible to adopt a configuration in which a part of the discrete functional blocks exists in a cloud server and data of the processing result is transferred via communication. For example, the decoding unit 104 may be realized by the same CPU as the control unit 101, or may be realized by another CPU. Alternatively, the decoding unit 104 may be realized by a GPU that operates upon receiving an instruction from the control unit 101. Alternatively, the decoding unit 104 may be realized through hardware processing executed by an electronic circuit configured for decoding processing. Furthermore, for example, the learning inference unit 105 may be realized by the same CPU as the control unit 101, or may be realized by another CPU. Alternatively, the learning inference unit 105 may be realized by a GPU that operates upon receiving an instruction from the control unit 101. Alternatively, the learning inference unit 105 may be realized through hardware processing executed by an electronic circuit configured for learning inference.

(Data Stored in Storage Medium, and Method of Decoding and Deploying the Same)

FIG. 2 is a diagram for describing the functional blocks that execute processing for deploying compressed moving image data in the control unit 101 (the analysis unit 111 and the decoded moving image generation unit 112). A moving image a and a moving image b, which are input data for high-definition moving image generation processing, are stored in the storage unit 106. Here, a moving image denotes a set of one or more image data pieces that are temporally continuous. The moving image a and the moving image b of the present embodiment have been shot simultaneously by an image capturing apparatus including an image sensor, and have been compressed using the MPEG method. The moving image a and the moving image b may be generated by applying thinning and reduction processing to each of the images shot by a single image sensor, or may be generated by shooting the same subject using image sensors that have different resolutions and frame rates. Below, it is assumed that the moving image a and the moving image b are two image groups obtained by executing different types of image processing with respect to one image that has been shot by one image sensor included in one image capturing apparatus. Moving image data pieces of the moving image a and the moving image b have each been compressed using the MPEG method, multiplexed together with imaging time information, and stored in the MP4 format. Note that a format other than the one described above may be used as long as it allows a pair of image data and corresponding imaging time information to be obtained from the storage unit 106.

The analysis unit 111 has a function of parsing moving image data pieces (in the present example, a file in the MP4 format) stored in the storage unit 106, and calculating the storage locations of encompassed compressed image data pieces and time information pieces registered as metadata inside the file. According to the MP4 format, location information indicating the storage locations of discrete frame data pieces and imaging time information pieces inside the file is stored in a Moov section. The analysis unit 111 deploys the Moov section of the moving image a from the storage unit 106 to the RAM 103, parses the Moov section, and generates a table Pa that includes frame numbers, location information of frame data pieces, and location information of imaging times of the moving image a. Furthermore, the analysis unit 111 similarly parses the Moov section of the moving image b as well, and generates a table Pb that includes frame numbers, location information of frame data pieces, and location information of imaging times of the moving image b. The table Pa and the table Pb are held in the RAM 103.

Figure 4:
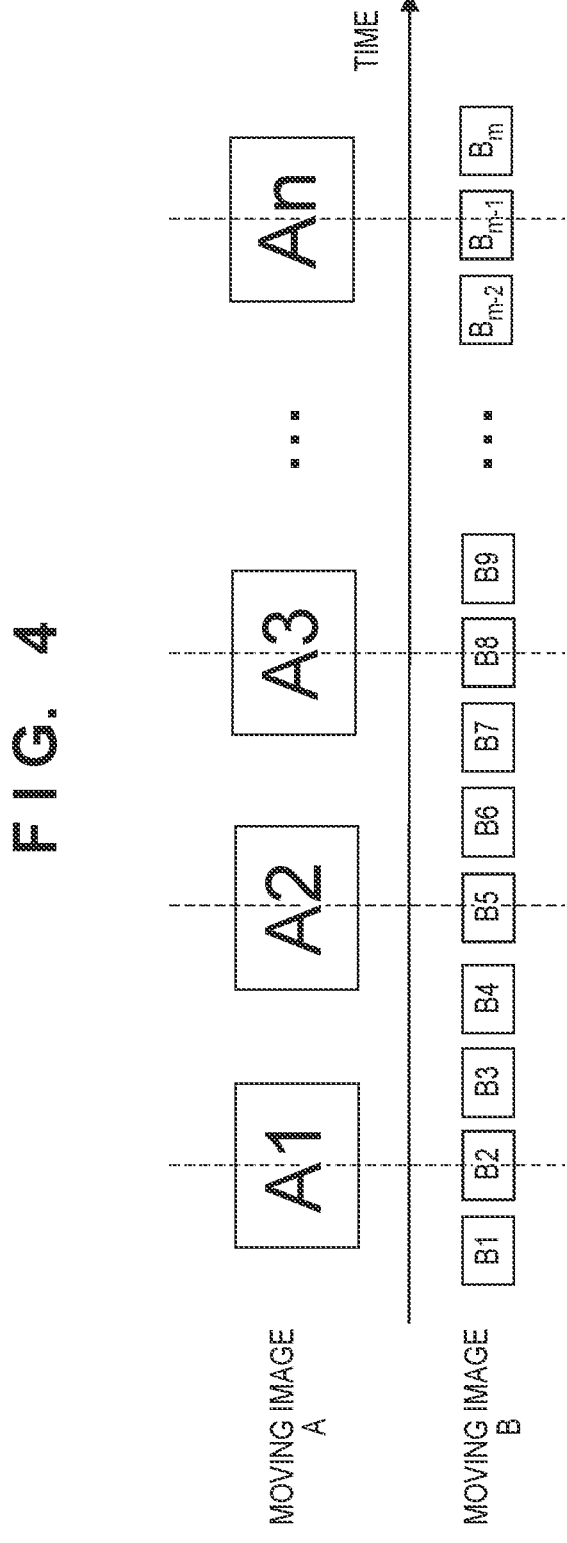
FIG. 4 is a diagram showing an example of a frame structure of input moving images according to the first embodiment.

In order to use the moving image a and the moving image b in the high-definition moving image generation processing, it is necessary to execute processing for converting them into an uncompressed format. As shown in FIG. 2, the decoded moving image generation unit 112 of the control unit 101 generates the moving image A and the moving image B by decoding the moving image a and the moving image b, and stores the moving image A and the moving image B into the storage unit 106. More specifically, the decoded moving image generation unit 112 references the table Pa and the table Pb held in the RAM 103, and sequentially inputs, to the decoding unit 104, frame data pieces of the moving image a and the moving image b held in the storage unit 106. The decoded moving image generation unit 112 multiplexes frame data pieces in an uncompressed format output from the decoding unit 104 together with imaging time information pieces that have been obtained with reference to the table Pa and the table Pb, and stores the result of multiplexing into the storage unit 106. Below, it is assumed that the moving image A has been obtained by decoding the moving image a, and the moving image B has been obtained by decoding the moving image b. Furthermore, the decoded moving image generation unit 112 generates a table PA that includes frame numbers, location information indicating the storage locations of frame data pieces, and location information indicating the storage locations of imaging times of the moving image A, and stores the table PA into the RAM 103. Similarly, the decoded moving image generation unit 112 generates a table PB that includes frame numbers, location information indicating the storage locations of frame data pieces, and location information indicating the storage location of imaging times of the moving image B, and stores the table PB into the RAM 103. FIG. 4 shows examples of frame structures of the moving image A and the moving image B. In FIG. 4, the total number of frames of the moving image A is n, and the total number of frames of the moving image B is m. A frame pair indicated by a dash line (e.g., A1 and B2, A2 and B5, and A3 and B8) is a frame pair that has the same imaging time information, meaning that the images of such frames have been shot at the same timing.

Figure 3:
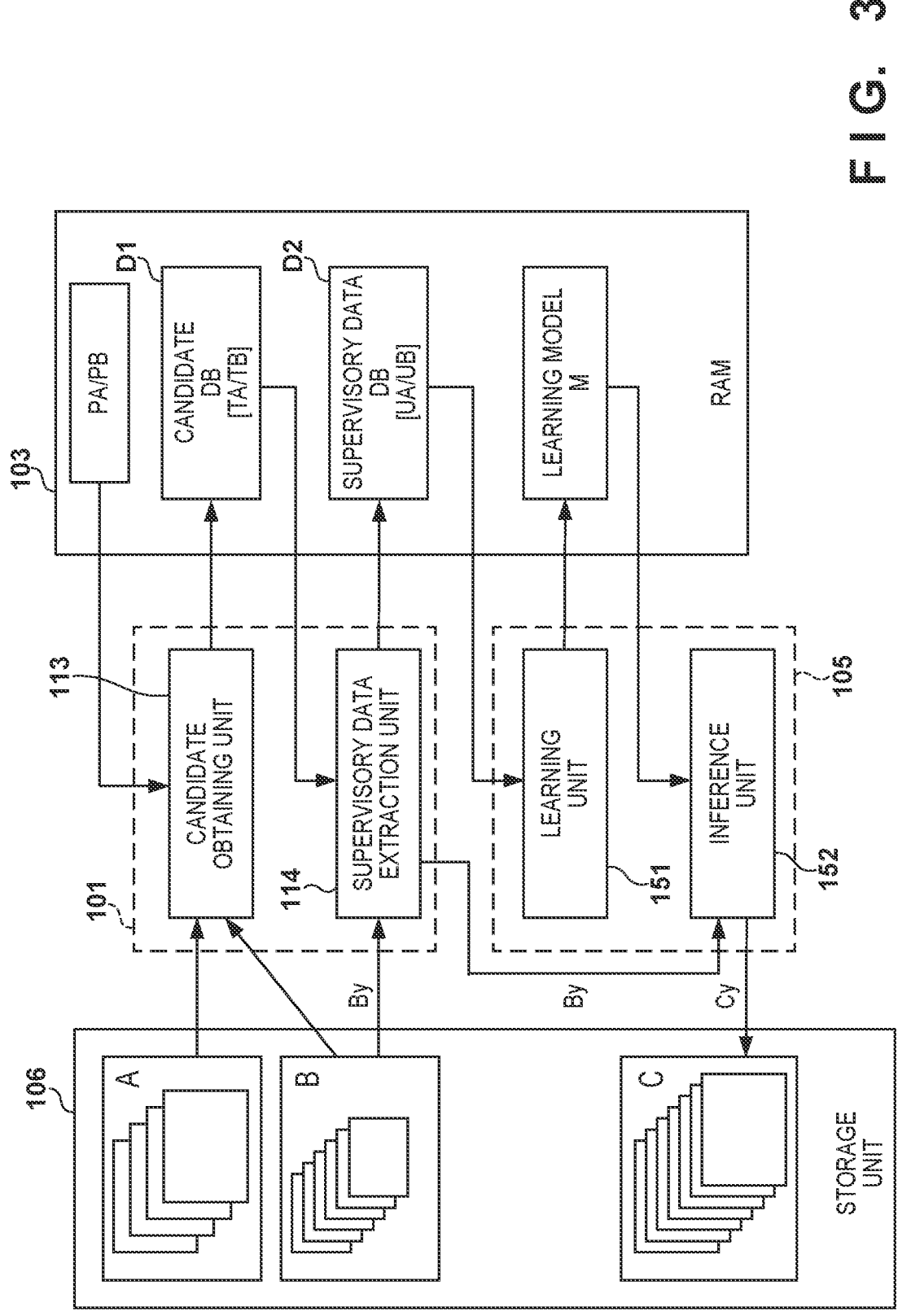
FIG. 3 is a diagram for describing a functional configuration of the image processing apparatus according to the first embodiment.

Next, a description is given of processing for generating a high-definition image according to the present embodiment. This processing is roughly divided into two types of processing: "supervisory data candidate obtainment processing", and "high-definition moving image generation processing". FIG. 3 is a diagram for describing the operations of functional blocks in image processing in the image processing apparatus 100 according to the first embodiment. As has been described using FIG. 2, the moving image A and the moving image B are held in the storage unit 106, and the table PA and the table PB are held in the RAM 103. The "supervisory data candidate obtainment processing" is executed by the candidate obtaining unit 113. Meanwhile, the "high-definition moving image generation processing" is executed by the supervisory data extraction unit 114, learning unit 151, and inference unit 152. The candidate obtaining unit 113 generates a candidate database D1 by extracting, from a frame group of the moving image A and a frame group of the moving image B, frame pairs to be used as candidates for supervisory data as supervisory data candidates. A frame By, which is a high resolution target and a high definition target, is obtained from the frame group of the moving image B. In order to generate a learning model that is appropriate for inference of high frequency components of the frame By, the supervisory data extraction unit 114 extracts supervisory data pieces that are more appropriate for learning from among the supervisory data candidates registered with the candidate database D1, and generates a supervisory data database D2. The learning unit 151 of the learning inference unit 105 generates a learning model M for the frame By with use of the supervisory data database D2. The inference unit 152 executes high-definition processing for the frame By, which is a high resolution target, by inputting the frame By to the learning model M generated by the learning unit 151. Below is a more specific description of the "supervisory data candidate obtainment processing" and "high-definition moving image generation processing".

(Supervisory Data Candidate Obtainment Processing)

In the supervisory data candidate obtainment processing, the control unit 101 (candidate obtaining unit 113) generates the candidate database D1. In the first embodiment, the candidate obtaining unit 113 obtains, from among the frames of the moving image A and the moving image B, the pairs of a frame of the moving image A and a frame of the moving image B that have the same imaging time as supervisory data candidates. Specifically, every frame pair that has the same imaging time in the moving image A and the moving image B (frame pair indicated by a dash line in FIG. 4) is obtained as a supervisory data candidate. Before the later-described learning processing is executed, the candidate obtaining unit 113 researches which frames can be used as supervisory data, constructs the candidate database D1, and registers the result of this research therewith. FIG. 6 shows an exemplary data structure of the candidate database D1. The frame numbers of a frame group TA that can be used as supervisory data among the frame group of the moving image A, and of a frame group TB that can be used as supervisory data among the moving image B, in the respective moving image files are registered with the candidate database D1. Here, a frame pair with the same imaging time (a pair of the frame numbers thereof) is registered in association with each other using a unique index I inside the candidate database D1. For example, in the moving image A and the moving image B shown in FIG. 4, the frame pairs of A1 and B2, A2 and B5, and A3 and B8 (the subsequent pairs are omitted) are each a combination of frames that have been shot at the same time. In the candidate database D1 shown in FIG. 6, these pairs are stored using the frame numbers, and unique indexes I are appended thereto. In this way, the obtained supervisory data candidates are managed by the candidate database D1.

Using a flowchart of FIG. 5, the following further describes the details of the supervisory data candidate obtainment processing described above. In S501, the candidate obtaining unit 113 selects one frame from among the frames of the moving image A, and obtains a time information piece corresponding to the selected frame from the table PA. In the present embodiment, the frame is selected in a sequential order, starting from the beginning of the moving image A stored in the storage unit 106. More specifically, the candidate obtaining unit 113 selects one frame in a sequential order, starting from the beginning of the moving image A stored in the storage unit 106. Hereinafter, the selected frame is referred to as a frame Ax. The candidate obtaining unit 113 reads out a time information piece corresponding to the frame Ax with reference to the table PA stored in the RAM 103 from the storage unit 106, and transfers the same to the RAM 103.

In S502, the candidate obtaining unit 113 compares the time information piece of the frame Ax that has been read out in S501 with the time information pieces of the respective frames of the moving image B. Specifically, the candidate obtaining unit 113 sequentially obtains, from the storage unit 106, the imaging time information pieces of the respective frames of the moving image B with reference to the location information of the imaging times stored in the table PB, and compares them with the time information piece of the frame Ax. In S503, the candidate obtaining unit 113 obtains a frame of the moving image B that has the same imaging time as the frame Ax, and uses the obtained frame as a frame Bx.

In S504, the candidate obtaining unit 113 appends a unique index Ix inside the candidate database D1 to the combination of the aforementioned frame Ax and frame Bx, and registers them with the candidate database D1. Specifically, the candidate obtaining unit 113 issues the unique index Ix to the combination of the frame Ax and the frame Bx, and registers the index Ix, the frame number of the frame Ax in the moving image A, and the frame number of the frame Bx in the moving image B with the candidate database D1.

In S505, the candidate obtaining unit 113 determines whether processing of the aforementioned S501 to S504 has been completed with respect to every frame of the moving image A. If it is determined that the processing has been completed (YES of S505), processing is ended. If it is determined that the processing has not been completed (NO of S505), processing returns to S501, and the aforementioned processing is executed with respect to the next frame of the moving image A. As a result of the aforementioned processing, the candidate database D1 is generated.

Note that although the frame pair to be registered with the candidate database D1 is determined by comparing the imaging times in S502 in the present embodiment, no limitation is intended by this. For example, it is permissible to reduce the frame Ax to the resolution XB, determine similarities using the indexes indicating the degrees of similarity between the reduced frame Ax and the images of the respective frames of the moving image B, and select a frame pair to be registered with the candidate database D1 using the result of this determination. In this case, the candidate obtaining unit 113 has a similarity degree determination function of determining the degrees of similarity by comparing two or more image data pieces. Note that, for example, structural similarity indexes (SSIM) can be used as the indexes indicating the degrees of similarity among images. Furthermore, although the image of the frame Ax is reduced to the resolution XB in obtaining the indexes indicating the degrees of similarity, no limitation is intended by this. The image of the frame Ax may not be reduced, and the resolution after the reduction may be other than XB.

(High-Definition Moving Image Generation Processing)

Next, a description is given of the high-definition moving image generation processing executed by the control unit 101 (supervisory data extraction unit 114) and the learning inference unit 105 (learning unit 151 and inference unit 152). First, an overview of the high-definition moving image generation processing will be described with reference to FIG. 3. The supervisory data extraction unit 114 selects supervisory data that is appropriate for learning of "the learning model for the inference target frame By" from the candidate database D1, and generates the supervisory data database D2 (FIG. 3) (the details will be described later with reference to S702 and S703 of FIG. 7). The learning unit 151 generates the learning model using the extracted supervisory data (S704). Then, the inference unit 152 executes the high-definition processing by inferring the high frequency components of the inference target frame By using the learning model (S705), and obtains a frame (image) Cy, which is the result of rendering the inference target frame By high-definition. Note that before the start of the high-definition moving image generation processing, the control unit 101 generates a moving image C in the storage unit 106. At the time of the start of the generation of a high-definition moving image, the moving image C does not include frame data and are in a blank state. The inference unit 152 stores the generated frames Cy sequentially into the moving image C.

Below, the aforementioned high-definition moving image generation processing will be described more specifically with reference to a flowchart of FIG. 7. In S701, the supervisory data extraction unit 114 reads out one frame, as a high definition target frame, from the moving image B. In the present embodiment, the supervisory data extraction unit 114 reads out frames in a sequential order, one by one, starting from the beginning of the moving image B stored in the storage unit 106. Hereinafter, the frame that has been read out in S701 is referred to as a frame By. More specifically, the supervisory data extraction unit 114 reads out the frame data and the imaging time information piece of the frame By from the storage unit 106 with reference to the table PB, and transfers them to the RAM 103.

In S702, the supervisory data extraction unit 114 extracts, from the supervisory data candidates TB registered with the candidate database D1, frames with imaging times that are different from the imaging time of the frame By by an amount smaller than a threshold value that has been determined by a system in advance, and registers the extracted frames with the supervisory data database D2. For example, a single-frame display period of the moving image A (a single-frame display period at the frame rate XA) can be used as the threshold value. A structure of the supervisory data database D2 is similar to that of the candidate database D1 (FIG. 6). Specifically, first, the supervisory data extraction unit 114 obtains the time information pieces of the frame group TB registered with the candidate database D1 with reference to the location information in the table PB. The supervisory data extraction unit 114 compares each of the obtained time information pieces with the imaging time of the frame By, extracts frames that are different from the imaging time by an amount smaller than the threshold value from the frame group TB, and registers the extracted frames with the supervisory data database D2 in the RAM 103. Hereinafter, the frame group of the moving image B that has been registered with the supervisory data database D2 as a result of the foregoing processing is referred to as UB. Note that although the frame group with the imaging times that are different from the imaging time of the frame By by an amount smaller than the threshold value is extracted from the candidate database D1 in constructing the supervisory data database D2 in the present embodiment, no limitation is intended by this. The frame group UB may be extracted using the indexes indicating the degrees of similarity to the frame By. For example, the supervisory data extraction unit 114 may use the SSIM to extract, from the frame group TB, a frame group with indexes of the degrees of similarity to the frame By that are higher than a threshold value determined by the system in advance, and register the extracted frame group as the frame group UB.

In S703, the supervisory data extraction unit 114 registers the frames of the frame group TA that are respectively paired with the frames of the frame group UB in the candidate database D1 with the supervisory data database D2. Specifically, with reference to the candidate database D1 in the RAM 103, the supervisory data extraction unit 114 registers the frames of the frame group TA that are respectively associated with the frames of the frame group UB using the indexes I with the supervisory data database D2. At this time, the combination of two associated frames is not changed, and a unique index J inside the supervisory data database D2 is appended to each combination. Hereinafter, the frame group of the moving image A that has been registered with the supervisory data database D2 is referred to as UA.

Figure 8:
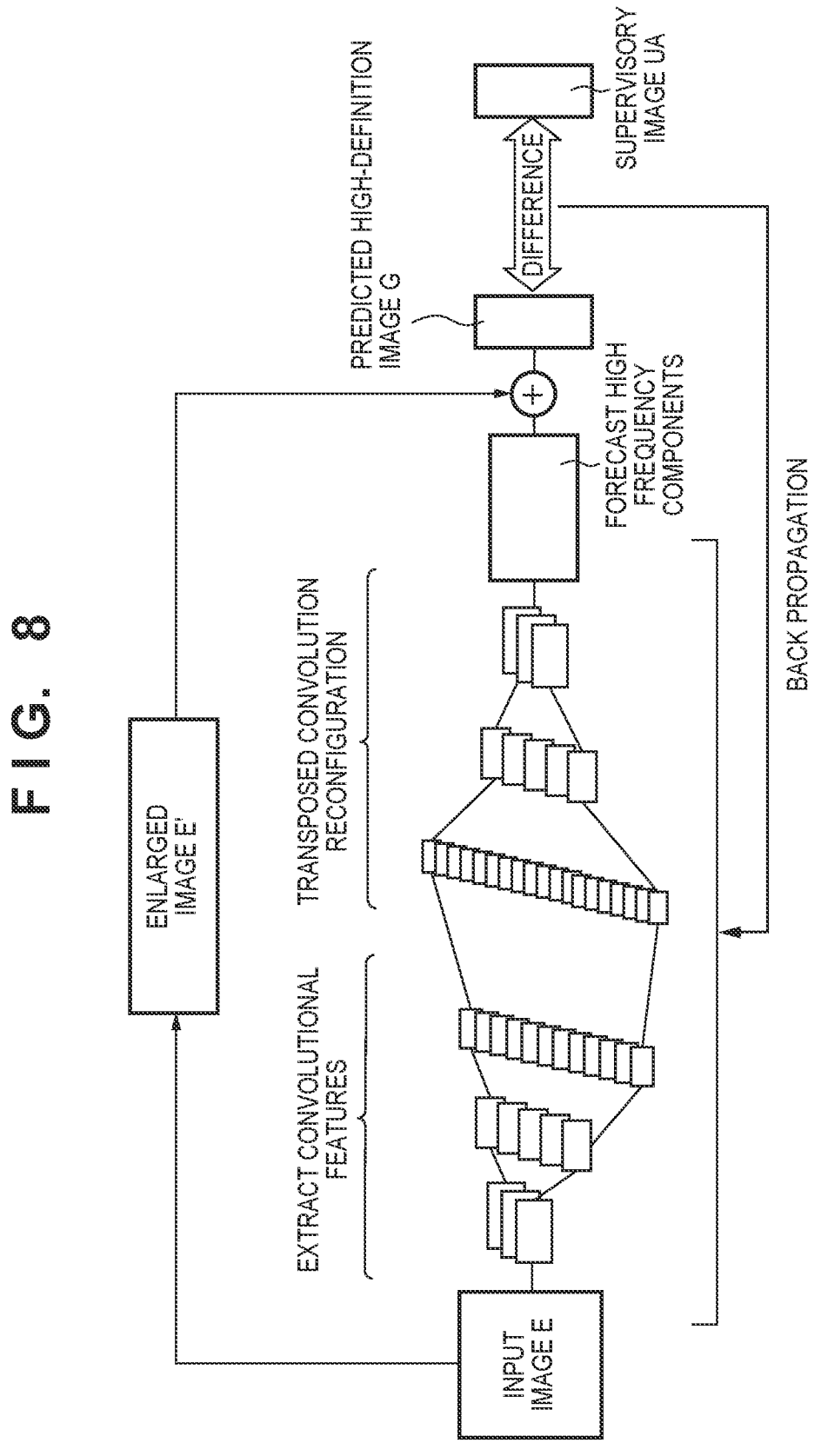
FIG. 8 is a schematic diagram for describing learning/inferring process according to the first embodiment.

In S704, the learning unit 151 performs learning using the supervisory data (the frame group UA and the frame group UB) registered with the supervisory data database D2, and generates the learning model M. FIG. 8 is a diagram schematically showing a learning model generation function of the learning unit 151. The learning model generation function includes a learning process and an inferring process, and furthermore, the inferring process can be categorized into a feature extraction process and a reconfiguration process that use filters, including a CNN. First, in the feature extraction process, the learning unit 151 inputs one image from the frame group UB to the CNN (regarded as an image E) and extracts convolutional features using the CNN, thereby generating a large number of feature maps. Next, in the reconfiguration process, the learning unit 151 generates forecast high frequency components by carrying out upsampling of all feature maps through transposed convolution. In the reconfiguration process, the learning unit 151 further performs image reconfiguration by adding an image E', which is the result of enlarging the image E using a bicubic method or the like, and the forecast high frequency components, thereby generating a predicted high-definition image G. In the learning process, the learning unit 151 compares the predicted high-definition image G generated in the aforementioned inferring process with an image H which is included among the frame group UA and which corresponds to the image E, and performs subtle tuning of the learning model M based on a back propagation method that uses the difference therebetween. The learning unit 151 improves the inference accuracy by repeating the aforementioned processing a predetermined number of times with respect to the same image E. By executing the aforementioned processing sequence with respect to each image of the frame group UB, the learning model M appropriate for the inference processing for the frame group UB is constructed.

As described above, the learning unit 151 reads out the frame data pieces of the frame pairs that have been registered as the supervisory data from the storage unit 106 with reference to the supervisory data database D2, the table PA, and the table PB, and executes the aforementioned learning model generation function. The learning unit 151 stores the learning model M generated by the learning model generation function into the RAM 103.

In S705, the inference unit 152 generates a high-definition frame Cy from the frame By through inference that uses the learning model M generated in S704. Specifically, first, the inference unit 152 reads out the learning model M stored in the RAM 103. Next, the inference unit 152 inputs the frame data (image) of the frame By that has been held in the RAM 103 in S701 to the CNN of the learning model M, and generates "high frequency components that are expected when the image of the frame By has been enlarged to the resolution XA". The inference unit 152 generates an image of the high-definition frame Cy with the resolution XA by adding the generated high frequency components to "an image obtained by linearly enlarging the image of the frame By to the resolution XA", and stores the generated image into the RAM 103. Note that the foregoing processing that is executed with respect to the frame By, from inference of high frequency components to generation of a high-definition image, is processing similar to the inferring process (the feature extraction process and the reconfiguration process) that has been described above using FIG. 8. The inference unit 152 additionally writes the frame data of the high-definition frame Cy, which has been stored into the RAM 103, at the end of the high-definition moving image C in the storage unit 106. Furthermore, a copy of the imaging time information of By is generated, and multiplexed with and stored into the moving image C as the imaging time of the high-definition frame Cy.

In S706, the control unit 101 determines whether the aforementioned processing has been completed with respect to frames of the moving image B in an inference target range (which may be all frames of the moving image B, or may be a part of frames thereof). If it is determined that the aforementioned processing has not been completed (NO of S706), processing proceeds to S701, the supervisory data extraction unit 114 selects the next frame of the moving image B as the frame By, and the aforementioned processing is repeated. On the other hand, if it is determined that the aforementioned processing has been completed (YES of S706), the present processing is ended. As described above, once the high-definition moving image generation processing has been ended, the high-definition moving image C with the resolution XA and the frame rate FB are stored in the storage unit 106 in an uncompressed format.

Note that although each functional block has been described above as being realized only by the control unit 101 or only by the learning inference unit 105, no limitation is intended by this. For example, each functional block may be realized by coordinated operations of the control unit 101 and the learning inference unit 105. For example, the functions of the inference unit 152 may be realized by the control unit 101 and the learning inference unit 105, whereas processing for storing the high-definition frame Cy and the imaging time into the moving image C in the storage unit 106 may be executed by the control unit 101.

Furthermore, although the supervisory data candidate obtainment processing is executed before executing the learning processing for the entire moving image and the high-definition moving image generation processing in the present embodiment, it may be executed in parallel with the execution of the high-definition moving image generation processing. Furthermore, although the learning model M is newly generated for each inference target frame and the learning model M that was previously generated is discarded in S704 in the present embodiment, no limitation is intended by this. For example, a learning model M' that has been trained outside in advance may be loaded, and additional learning that uses the frame group UA and the frame group UB may be performed with respect to the loaded learning model M' in S704.

As described above, the first embodiment uses the learning model M that has been trained using an image group that is close to a high definition target image among an image group that has been shot during the same imaging period, and therefore, images can be rendered high-definition with high accuracy. In addition, as an image pair of the same time among two image groups is used as supervisory data, learning can be performed with higher accuracy.

Second Embodiment

Figure 9:
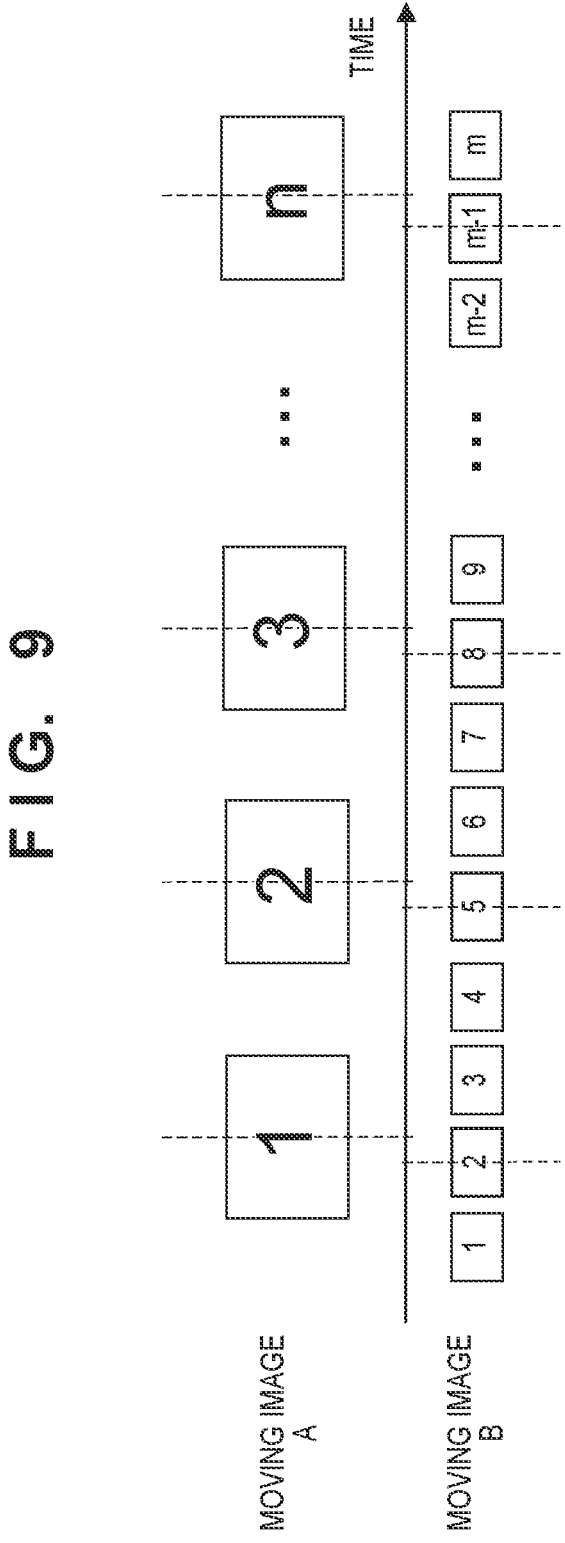
FIG. 9 is a diagram showing an example of a frame structure of input moving images according to a second embodiment.

In the supervisory data candidate obtainment processing of the first embodiment, combinations of a frame of the moving image A and a frame of the moving image B that have the same imaging time are registered with the candidate database D1. In a case where the moving image A and the moving image B are obtained from moving images that have been shot simultaneously using the same image sensor in one image capturing apparatus, frames with the same imaging time can be obtained from the moving image A and the moving image B as exemplarily shown in FIG. 4. However, this method has a possibility that the supervisory data candidates are not extracted appropriately in a case where the moving image A and the moving image B are moving images that have been shot by a plurality of image sensors during the same imaging period. This is because, as exemplarily shown in FIG. 9, the moving image B does not always include frames that have the same imaging times as frames of the moving image A. Note that examples of a configuration in which the moving image A and the moving image B are shot by a plurality of image sensors include a configuration in which shooting is performed using an image capturing apparatus that includes a plurality of image sensors, and a configuration in which shooting is performed using a plurality of image capturing apparatuses that include one or more image sensors. According to supervisory data candidate obtainment processing of a second embodiment, the aforementioned problem is solved by registering, with the candidate database D1, combinations of frames whose time difference is smaller than a threshold value that has been determined in advance, even if frames of the moving image A and frames of the moving image B do not have the same imaging times.

The second embodiment is similar to the first embodiment in the configuration of the image processing apparatus 100 and high-definition image generation processing, but different from the first embodiment in a part of the supervisory data candidate obtainment processing. FIG. 10 is a flowchart for describing the supervisory data candidate obtainment processing according to the second embodiment. The following mainly describes the differences from the supervisory data candidate obtainment processing of the first embodiment (FIG. 5).

Processing of S1001 and S1002 is similar to S501 and S502 of the first embodiment (FIG. 5). In S1003, the candidate obtaining unit 113 obtains, from among frames of the moving image B, a frame with an imaging time that is different from the imaging time of one frame Ax of the moving image A by an amount smaller than a threshold value that has been determined in advance as a frame Bx, and registers the frame Bx with the candidate database D1 in the RAM 103. Note that, for example, a per-frame display period at the frame rate XB of the moving image B can be used as such a threshold value. Processing of subsequent S1004 and S1005 is similar to S504 and S505 of the first embodiment (FIG. 5).

As described above, according to the second embodiment, supervisory data candidates can be extracted appropriately even if the moving image A and the moving image B have been obtained by a plurality of image sensors.

Third Embodiment

In the first embodiment and the second embodiment, the moving image A and the moving image B have been shot at least during the same imaging period. Therefore, in the first embodiment and the second embodiment, the supervisory data candidate obtainment processing cannot obtain supervisory data candidates in a case where the moving images A and B have been shot by the same or a plurality of image capturing apparatuses at different times (the imaging periods thereof do not overlap) as shown in FIG. 11. A third embodiment will be described in relation to supervisory data candidate obtainment processing for appropriately obtaining supervisory data candidates with respect to the moving image A and the moving image B shown in FIG. 11. In the supervisory data candidate obtainment processing of the third embodiment, the indexes indicating the degrees of frame similarity between frames of the moving image A and frames of the moving image B are calculated, and frame pairs with indexes equal to or larger than a threshold value that has been determined by the system in advance are registered with the candidate database D1. Note that, for example, the SSIM can be used as the indexes indicating the degrees of frame similarity as stated earlier. Note that in determining similarities, the images of the frames of the moving image A are reduced to the resolution XB, and the indexes indicating the degrees of similarity are calculated using the reduced images and the images of the discrete frames of the moving image B. However, in this case, the images of the frames of the moving image A may not be reduced, and the resolution after the reduction may be other than XB.

FIG. 12 is a flowchart for describing the supervisory data candidate obtainment processing according to the third embodiment. With reference to the flowchart of FIG. 10, the following mainly describes the differences from the supervisory data candidate obtainment processing of the first embodiment (FIG. 5).

In S1201, the candidate obtaining unit 113 selects one frame among the frames of the moving image A, and reads in a frame data piece of the selected frame. The candidate obtaining unit 113 selects one frame in a sequential order, starting from the beginning of the moving image A stored in the storage unit 106 (hereinafter, the selected frame is referred to as a frame Ax), and transfers a frame data piece of the frame Ax from the storage unit 106 to the RAM 103 with reference to the table PA stored in the RAM 103.

In S1202, the candidate obtaining unit 113 calculates the degrees of similarity between the frame Ax that has been read out in S1201 and the discrete frames of the moving image B. More specifically, with reference to the location information (related to frame data pieces) in the table PB, the candidate obtaining unit 113 sequentially retrieves frame data pieces of the respective frames of the moving image B from the storage unit 106 into the RAM 103. Then, using a similarity degree index calculation function (the SSIM in the present embodiment), the candidate obtaining unit 113 calculates the indexes of the degrees of similarity between the frame Ax and the discrete frames, and stores the indexes into the RAM 103. In S1203, the candidate obtaining unit 113 obtains, as a frame Bx, a frame of the moving image B with an index of a degree of similarity that has the largest numerical value among the indexes calculated in S1202. Processing of S1204 and S1205 thereafter is similar to S504 and S505 of the first embodiment (FIG. 5).

As described above, according to the third embodiment, appropriate supervisory data candidates can be obtained even if the imaging periods of two image groups (the moving image A and the moving image B) do not overlap.

Fourth Embodiment

A fourth embodiment will be described in relation to the improvement of performance of the learning model M in the learning processing of the first embodiment to the third embodiment, with image similarity additionally taken into account. As described in the first embodiment, appropriate supervisory data pieces are extracted with respect to the frame By selected in S701 of FIG. 7, and the learning model M is generated/updated using these supervisory data pieces in S704. At the time of the generation/update of this learning model M, tuning of a network parameter is performed using back propagation as shown in FIG. 8. In the fourth embodiment, the intensity of tuning that uses back propagation is controlled based on the attributes (e.g., imaging times) of the frame used in learning (the image E) and the frame By that acts as a high resolution and high definition target, or on the images of these frames. More specifically, in the learning process, the learning unit 151 determines a coefficient so that a higher similarity between a frame of the frame group UB, which is input in a sequential order, and the frame By exerts more influence on the update of the network parameter through back propagation, whereas a lower similarity therebetween exerts less influence. Here, the image similarity may be obtained simply based on the time difference between the frame By and the input image E, or may be obtained by comparing the images of both frames using the SSIM or the like. For example, in a case the former (the method that uses the time difference) is used, a configuration may be adopted in which the tuning intensity is multiplied by a coefficient of 1 if the time difference is smaller than a threshold value, and the tuning intensity is multiplied by a coefficient of 0.5 if the time difference is equal to or larger than the threshold value, as follows.

```
if (ABS (time difference between By and E) < threshold value {
    coefficient = 1
} else {
    coefficient = 0.5
}
```

On the other hand, in a case where the latter (the method that uses similarity) is used, a configuration may be adopted in which a structural similarity index (SSIM) is used as a coefficient for the tuning intensity, as follows.

$$\text{coefficient}=\text{SSIM}(By \text{ and } E)[0 \le \text{SSIM}(x) \le 1]$$

Note that examples of a method of increasing or reducing the extent of influence include a method where the rate of update of the network parameter through back propagation is multiplied by the aforementioned coefficient, a method where the number of times a learning loop is performed for the input image E is multiplied by the coefficient rather than multiplying the rate of update of the parameter by the coefficient, and so forth.

Fifth Embodiment

The first embodiment to the third embodiment have been described in relation to a configuration in which pairs of a frame from the moving image A and a frame from the moving image B are extracted as supervisory data candidates, and registered with the candidate database D1. In a fifth embodiment, a moving image A' is generated by converting the moving image A into the resolution XB of the moving image B, and the candidate obtaining unit 113 obtains supervisory data candidates using the moving image A and the moving image A'. That is to say, the candidate obtaining unit 113 of the fifth embodiment extracts, from the moving image A', a frame Ax' having the same frame number as the frame Ax of the moving image A, and registers a pair of the frame Ax and the frame AX' as a supervisory data candidate with the candidate database D1. Below, the fifth embodiment will be described in detail.

(Description of Configuration of Image Processing Apparatus 100)

A hardware configuration and a functional configuration of the image processing apparatus 100 are similar to those in the first embodiment (FIG. 1). However, the control unit 101 of the fifth embodiment also has a resolution conversion function for applying bicubic-based reduction and conversion to an image resolution. In executing resolution reduction processing with respect to image data stored in the RAM 103, this resolution conversion function calculates the pixel value of a pixel that needs to be interpolated by referencing pixels therearound.

(Data Stored in Storage Unit 106, and Method of Decoding and Deploying the Same)

In the first embodiment, the moving image a and the moving image b stored in the storage unit 106 are converted into an uncompressed format, and the result of decoding the moving image a and the result of decoding the moving image b are stored into the storage unit 106 as the moving image A and the moving image B, respectively. In the fifth embodiment, the moving image A' is further generated by converting the moving image A into the resolution XB of the moving image B. More specifically, with reference to the table PA stored in the RAM 103, the control unit 101 sequentially inputs frame data pieces of the frames of the moving image A stored in the storage unit 106 (hereinafter, frames K) to the resolution conversion function of the control unit 101. Then, the resolution conversion function outputs frames having frame data pieces with the resolution XB (hereinafter, frames K'). The control unit 101 multiplexes them together with the imaging time information pieces of the frames K that have been read out from the storage unit 106 with reference to the table PA, and stores them into the storage unit 106 as the frames of the moving image A'. Furthermore, a table PA' that holds the frame numbers of the respective frames, location information of frame data pieces, and location information of imaging time data pieces of the moving image A' is stored into the RAM 103. Examples of these moving image A, moving image B, and moving image A' are shown in FIG. 13. Images (A1' to An') are generated by reducing the images (A1 to An) of the respective frames of the moving image A into the resolution XB, and stored into the storage unit 106 as the moving image A'. Note that although the resolution of the moving image A has been reduced to XB in the foregoing example, no limitation is intended by this. It is sufficient that the moving image A' be images that have been converted to have a resolution lower than the resolution of the moving image A. However, by using the images that have been converted into the same resolution as a high definition target image, a learning model that is more appropriate for the high definition target image can be constructed.

(Supervisory Data Candidate Obtainment Processing)

FIG. 14 shows the configurations and the operations of functional blocks in image processing in the image processing apparatus 100 of the fifth embodiment. With respect to discrete frames of the moving image A and the moving image A', the candidate obtaining unit 113 obtains combinations of frames that have the same frame number, and registers them with the candidate database D1. More specifically, with respect to each frame of the moving image A described in the table PA, the candidate obtaining unit 113 searches the moving image A' for a frame that has the same frame number with reference to the table PA'. The candidate obtaining unit 113 appends a unique index I to the combination of the frames of the moving image A and the moving image A' that have the same frame number, and registers the combination with the candidate database D1. A frame group of the moving image A and a frame group of the moving image A' that have been registered with the candidate database D1 will be referred to as TA and TA', respectively.

(High-Definition Moving Image Generation Processing)

With reference to a flowchart of FIG. 15, the following mainly describes the differences from processing of the first embodiment (FIG. 6).

Figure 7:
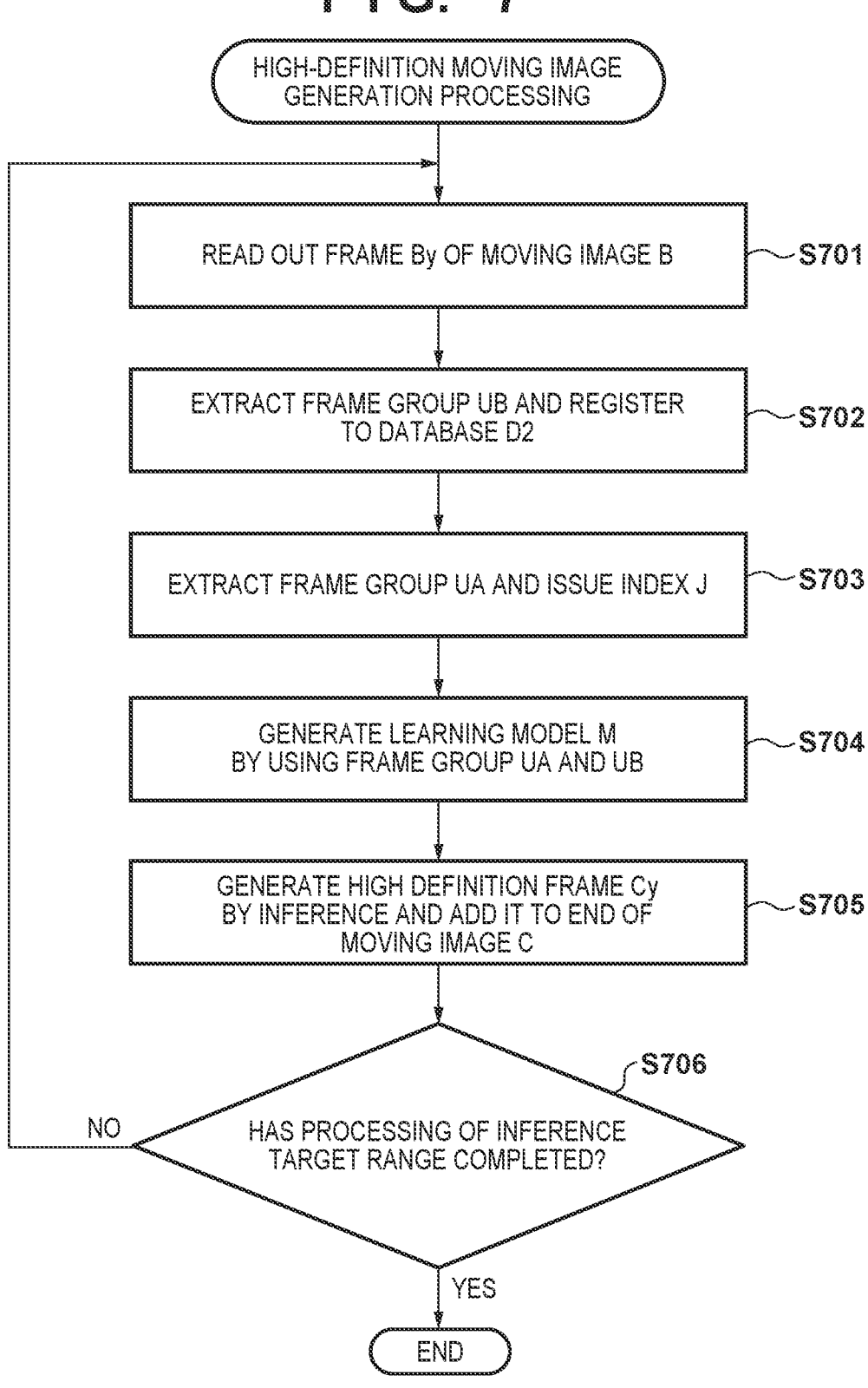
FIG. 7 is a flowchart of high-definition moving image generation processing according to the first embodiment.

Processing of S1501 is similar to S701 of the first embodiment (FIG. 7). In S1502, the supervisory data extraction unit 114 extracts, from the frame group TA' of supervisory data candidates registered with the candidate database D1, frames with imaging times that are different from the imaging time of the frame By by an amount smaller than a threshold value that has been determined by the system in advance. For example, a single-frame display period of the moving image A (a single-frame display period at the frame rate XA) can be used as the threshold value. The supervisory data extraction unit 114 registers the extracted frames with the supervisory data database D2. Specifically, first, the supervisory data extraction unit 114 obtains the time information pieces of the frames registered as the frame group TA' with reference to the table PA'. The supervisory data extraction unit 114 registers, with the supervisory data database D2 in the RAM 103, the frames with time information pieces that are different from the time of the frame By by an amount smaller than the threshold value among the obtained time information pieces of the frame group TA'. Hereinafter, the frame group of the moving image A' that has been registered with the supervisory data database D2 is referred to as a frame group UA'. Note that although the frames with imaging times that are different from the imaging time of the frame By by an amount smaller than a predetermined threshold value are extracted from the candidate database D1 in the present embodiment, no limitation is intended by this. For example, it is permissible to extract, from the frame group TA', frames for which the indexes indicating the degrees of similarity between the images of the respective frames of the frame group TA' and the image of the frame By (e.g., SSIM) are higher than a threshold value that has been determined by the system in advance, and register the extracted frames with the supervisory data database D2.

In S1503, the supervisory data extraction unit 114 registers, with the supervisory data database D2, the frames of the frame group TA that are respectively associated with the frames of the frame group UA' using the indexes I. Specifically, with reference to the candidate database D1 in the RAM 103, the supervisory data extraction unit 114 registers the frames of the frame group TA that are respectively associated with the frames of the frame group UB using the indexes I with the supervisory data database D2. At this time, the associated combination (frame pair) is not changed, and a unique index J inside the supervisory data database D2 is appended to each combination. Hereinafter, the frame group of the moving image A that has been registered with the supervisory data database D2 is referred to as the frame group UA.

In S1504, the learning unit 151 performs learning using the frame group UA and the frame group UA' with reference to the supervisory data database D2, and generates the learning model M. Specifically, first, the learning unit 151 reads out frame data pieces from the storage unit 106 with reference to the supervisory data database D2 and the tables PA and PA', and inputs the frame data pieces to the learning model generation function. The learning unit 151 performs learning, through the learning model generation function, using the frame data pieces that have been read out, and stores the learning model M that has been generated as the result of learning into the RAM 103. The details of training of the learning model are as described above with reference to FIG. 8. Processing of subsequent S1505 and S1506 is similar to that of the first embodiment (processing of S705 and S706 of FIG. 7).

As described above, according to each embodiment, supervisory data pieces to be used in training of the learning model are selected based on a high definition target image. Therefore, the learning model that has been trained using the selected supervisory data pieces can infer high frequency components of the high definition target image with higher accuracy, and can obtain a highly accurate high-definition image. That is to say, an improvement in the accuracy of resolution enhanced technologies for moving images, which render moving images high-definition, is realized.

Note that although the image that is paired with the image selected from the moving image A in the obtainment of supervisory data candidates is either an image selected from the moving image B based on an imaging time or image similarity, or an image obtained by reducing the resolution of the selected image, in the above-described embodiments, no limitation is intended by this. It is sufficient that the image related to the image that has been selected from the moving image A to be used as supervisory data candidates be an image that has a lower resolution than the selected image and are related to the selected image. Whether it is the image related to the image selected from the moving image A may be determined based on, for example, a common characteristic, such as a temperature at the time of shooting, an imaging location, and an imaging direction.

Furthermore, although the above embodiments have been described in relation to two-phased processing in which the candidate database D1 is generated and then the supervisory data database D2 is generated, no limitation is intended by this. For example, the supervisory data extraction unit 114 may extract frames that can be paired with supervisory data pieces from the moving image A based on the frame By, and obtain supervisory data pieces by using the extracted frames and the frames related to the extracted frames as pairs. However, in a case where a plurality of images of the moving image B are rendered high-definition in sequence, it is more efficient to generate the candidate database D1, extract an appropriate supervisory data piece from the candidate database D1 in accordance with a high definition target image, and use the extracted supervisory data piece, as in each of the above-described embodiments.

Furthermore, although the moving image a, as well as the moving image b that has a lower resolution than the moving image a, are used as processing targets in each of the above-described embodiments, no limitation is intended by this. For example, the uncompressed moving image a, as well as the moving image b obtained by compressing and decompressing the moving image a, may be used as processing targets. In this case, the moving image a may be stored after frames thereof have been thinned out. In this way, the relationship between the moving image a and the moving image b that are used as processing targets in each of the above-described embodiments is not limited to the magnitude of resolution, and it is sufficient that the moving image a be sharper than the moving image b. That is to say, it is sufficient that the image group that composes the moving image a (moving image A) includes more high frequency components than the image group that composes the moving image b (moving image B) does. For example, processing of each of the above-described embodiments can be applied as long as each image of the image group of the moving image a corresponds to one or more images among the image group of the moving image b, and each image of the image group of the moving image a is an image that includes more high frequency components than a corresponding image of the image group of the moving image b does.

Furthermore, although moving image data pieces have been described above for the sake of simplicity, each of the above-described embodiments can be applied to an apparatus that can, for example, generate a still image at a predetermined timing while a moving image is stored, also in the following case. That is to say, this is a case where a still image is adopted as data equivalent to the moving image a, and a moving image is adopted as data equivalent to the moving image b. For example, assume that one of the above-described embodiments is applied to an image capturing apparatus that performs shooting using an image sensor with a 6K data size in a Raw format at 60 fps. Also, for example, assume that data stored in the format of JPEG, HEIF, or the like while maintaining the 6K size through development processing and still image compression is used as a still image. Furthermore, for example, assume that Raw data pieces obtained by converting 6K data pieces, which have been obtained by the image sensor, into a 2K data size have been recorded in the format of MP4 or the like through development processing and moving image compression, and the stored data pieces (moving image data pieces of the 2K size at 60 fps) are used as a moving image. Under such assumptions, if a user performs continuous shooting of still images by depressing a release switch while 2K moving image data pieces are stored at 60 fps on the image capturing apparatus, a 6K still image is generated at an interval of, for example, 10 fps in relation to the frame rate of the moving image (60 fps). By applying one of the above-described embodiments to still images and the moving image that have been generated in this manner, for example, data with the quality of still images that corresponds to a moving image in a period in which a plurality of still images have been shot can be generated. That is to say, a system that obtains a moving image as if by shooting a moving image with the 6K size, which is the size of still images, at a frame rate of 60 fps can be realized. Furthermore, in this case, the image capturing apparatus prepares still images and a moving image, and in addition, learning and inference processing are executed and data with a quality of still images that corresponds to the moving image is generated within the image capturing apparatus.

According to the present disclosure, images can be rendered high-definition with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that renders images of a second image group high-definition using a first image group, the second image group including less high frequency components than the first image group does, the image processing apparatus comprising:
    at least one processor and at least one memory storing instructions that, when executed by the at least one processor, cause the at least one processor to:
    select, from among supervisory data pieces that each include (i) an image included in the first image group as one of an image pair and (ii) a corresponding paired image that includes less high frequency components than the image included in the first image group, a supervisory data piece to be used in training based on a high definition target image selected from the second image group, wherein selecting the supervisory data piece comprises selecting, from among the supervisory data pieces, the supervisory data piece satisfying at least one of: (a) an imaging time difference between the high definition target image and an image included in the supervisory data piece being smaller than a predetermined threshold value, or (b) a similarity between the high definition target image and the image included in the supervisory data piece being higher than a predetermined threshold value;
    train a learning model using the selected supervisory data piece;
    infer high frequency components of the high definition target image using the learning model; and
    generate a high-definition image based on the high definition target image and the inferred high frequency components.

2. The image processing apparatus according to claim 1, wherein the instructions further cause the at least one processor to:
    obtain, as supervisory data candidates, pairs of an image selected from the first image group and an image which includes less high frequency components than the selected image does and which is related to the selected image,
    wherein selecting the supervisory data piece to be used in training comprising selecting from among the obtained supervisory data candidates.

3. The image processing apparatus according to claim 2, wherein
    obtaining the supervisory data candidates comprises obtaining, from the second image group, images related to images selected from the first image group.

4. The image processing apparatus according to claim 3, wherein
    obtaining the supervisory data candidates comprises obtaining, from the second image group, images that have the same imaging times as the selected images.

5. The image processing apparatus according to claim 3, wherein
    obtaining the supervisory data candidates comprises obtaining, from the second image group, images with imaging times that are different from imaging times of the selected images by an amount smaller than a predetermined threshold.

6. The image processing apparatus according to claim 3, wherein
    obtaining the supervisory data candidates comprises obtaining, from the second image group, images that exhibit the highest similarity to the selected images from the second image group.

7. The image processing apparatus according to claim 6, wherein
    the first image group has a first resolution, and the second image group has a second resolution lower than the first resolution, and
    obtaining the supervisory data candidates comprises obtaining similarities between images obtained by reducing the selected images to the second resolution and images of the second image group.

8. The image processing apparatus according to claim 2, wherein obtaining the supervisory data candidates comprises obtaining, images obtained by lowering a resolution of the selected images through reduction of the selected images.

9. The image processing apparatus according to claim 8, wherein the first image group has a first resolution, and the second image group has a second resolution lower than the first resolution, and the obtained images related to the selected images are images obtained by reducing the selected images to the second resolution.

10. The image processing apparatus according to claim 2, wherein selecting unit selects, as the supervisory data piece to be used in training comprises selecting from among the supervisory data candidates a supervisory data candidate that includes an image with an imaging time that is different from an imaging time of the high definition target image by an amount smaller than a predetermined threshold value.

11. The image processing apparatus according to claim 2, wherein selecting unit selects, as the supervisory data piece to be used in training comprises selecting from among the supervisory data candidates, a supervisory data candidate that includes an image whose similarity to the high definition target image is higher than a predetermined threshold value.

12. The image processing apparatus according to claim 1, wherein training the learning model comprises controlling an update of a parameter through back propagation in the training based on the supervisory data piece to be used in training and on the high definition target image.

13. The image processing apparatus according to claim 12, wherein training the learning model comprises determining a coefficient based on the supervisory data piece to be used in learning and on the high definition target image, and controlling an amount of the update of the parameter through the back propagation based on the coefficient.

14. The image processing apparatus according to claim 12, wherein training the learning model comprises determining a coefficient based on the supervisory data pieces to be used in training and on the high definition target image, and controlling the number of times the update of the parameter through the back propagation is repeated based on the coefficient.

15. The image processing apparatus according to claim 13, wherein training the learning model comprises determining the coefficient based on a difference between an imaging time of an image of the supervisory data piece to be used in training and the imaging time of the high definition target image.

16. The image processing apparatus according to claim 13, wherein training the learning model comprises determining the coefficient based on a similarity between an image of the supervisory data piece to be used in training and the high definition target image.

17. The image processing apparatus according to claim 1, wherein the first image group and the second image group are two image groups obtained by executing different types of image processing with respect to one set of images shot by one image sensor included in one image capturing apparatus.

18. The image processing apparatus according to claim 1, wherein the first image group and the second image group are image groups that have been respectively shot by two image sensors.

19. The image processing apparatus according to claim 1, wherein a frame rate of the first image group is lower than a frame rate of the second image group.

20. An image processing method that renders images of a second image group high-definition using a first image group, the second image group including less high frequency components than the first image group does, the image processing method comprising:

selecting, from among supervisory data pieces that each include (i) an image included in the first image group as one of an image pair (ii) a corresponding paired image that includes less high frequency components than the image included in the first image group, a supervisory data piece to be used in training based on a high definition target image selected from the second image group, wherein selecting the supervisory data piece comprises selecting, from among the supervisory data pieces, the supervisory data piece satisfying at least one of: (a) an imaging time difference between the high definition target image and an image included in the supervisory data piece being smaller than a predetermined threshold value, or (b) a similarity between the high definition target image and the image included in the supervisory data piece being higher than a predetermined threshold value;

training a learning model using the selected supervisory data piece;

inferring high frequency components of the high definition target image using the learning model; and generating a high-definition image based on the high definition target image and the inferred high frequency components.

21. A non-transitory computer-readable storage medium storing a program for causing a computer to execute an image processing method that renders images of a second image group high-definition using a first image group, the second image group including less high frequency components than the first image group does, the image processing method comprising:

selecting, from among supervisory data pieces that each include (i) an image included in the first image group as one of an image pair (ii) a corresponding paired image that includes less high frequency components than the image included in the first image group, a supervisory data piece to be used in training based on a high definition target image selected from the second image group, wherein selecting the supervisory data piece comprises selecting, from among the supervisory data pieces, the supervisory data piece satisfying at least one of: (a) an imaging time difference between the high definition target image and an image included in the supervisory data piece being smaller than a predetermined threshold value, or (b) a similarity between the high definition target image and the image included in the supervisory data piece being higher than a predetermined threshold value;

training a learning model using the selected supervisory data piece;

inferring high frequency components of the high definition target image using the learning model; and generating a high-definition image based on the high definition target image and the inferred high frequency components.

* * * * *